United States Patent
Faure et al.

(10) Patent No.: US 6,216,979 B1
(45) Date of Patent: Apr. 17, 2001

(54) DE-ICING CONNECTION SYSTEMS FOR ROTOR AIRCRAFT ROTOR

(75) Inventors: Thierry Faure, Miramas; Vincent Scala, Lancon de Provence, both of (FR)

(73) Assignee: Eurocopter (FR)

( * ) Notice: Subject to any disclaimer, the term of this patent is extended or adjusted under 35 U.S.C. 154(b) by 0 days.

(21) Appl. No.: 09/351,417

(22) Filed: Jul. 9, 1999

(30) Foreign Application Priority Data

Jul. 20, 1998 (FR) .................................................. 98 09214

(51) Int. Cl.$^7$ .................................................. B64C 27/00
(52) U.S. Cl. ..................... 244/17.11; 244/17.23; 416/39; 416/95
(58) Field of Search ............................. 244/17.11, 17.23; 416/95, 39

(56) References Cited

U.S. PATENT DOCUMENTS

| | | | |
|---|---|---|---|
| 3,042,346 | * | 7/1962 | Hawley . |
| 3,455,396 | | 7/1969 | Cummings . |
| 3,644,703 | | 2/1972 | Nelson . |
| 4,252,504 | * | 2/1981 | Covington et al. .................. 416/143 |
| 5,020,741 | * | 6/1991 | Ziegler et al. .................... 244/134 D |
| 5,174,717 | | 12/1992 | Moore . |
| 5,322,415 | * | 6/1994 | White et al. ........................ 416/143 |
| 5,709,532 | * | 1/1998 | Giamati et al. ...................... 416/39 |
| 5,769,606 | | 6/1998 | Mondet . |

OTHER PUBLICATIONS

"Blade anti–icing systems for mil helicopters" by Sirotinsky B S. Sep. 14–16, 1993 (Cernobbio—Italy).

* cited by examiner

*Primary Examiner*—Peter M. Poon
*Assistant Examiner*—Kevin Jakel
(74) *Attorney, Agent, or Firm*—Piper Marbury Rudnick & Wolfe

(57) ABSTRACT

The system connects a power supply conductor to an electrical de-icing device of a blade by at least one cable with a first section connected to the power supply conductor by a connector and to a second section with an aerial brace in a flattened half-loop, connected to the de-icing device of the blade by a second connector, installed on the blade, by means of a third rectilinear and flat section, and of a second aerial brace. The first brace, of non-shielded structure, with an elongated part of flattened substantially rectangular transverse section, and with the concavity turned towards retaining and articulation means of a retaining part of the blade to the hub, is connected to the part by an articulation at least pivoting around a substantially parallel axis of pitch of the blade.

12 Claims, 3 Drawing Sheets

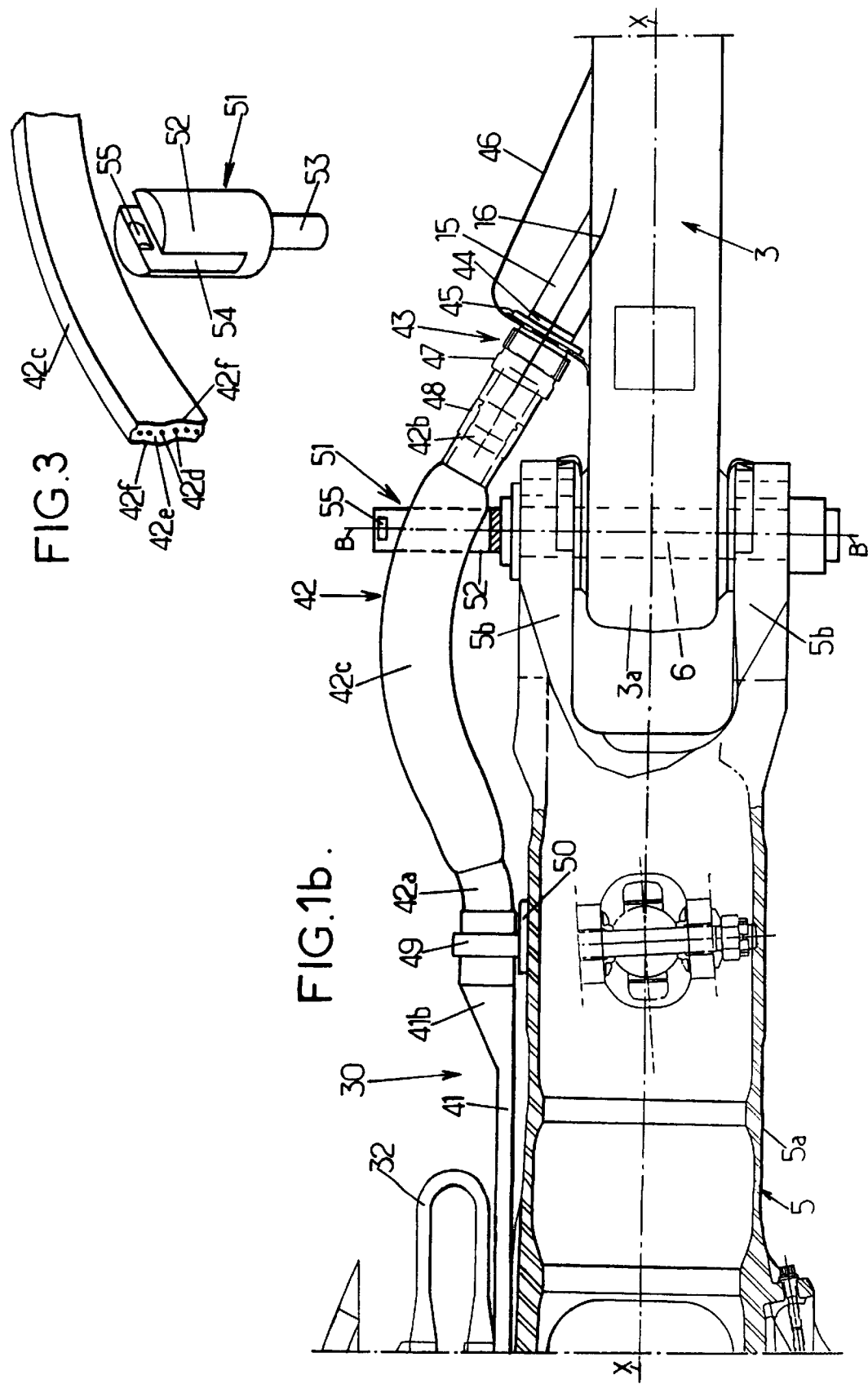

Figure 1A:
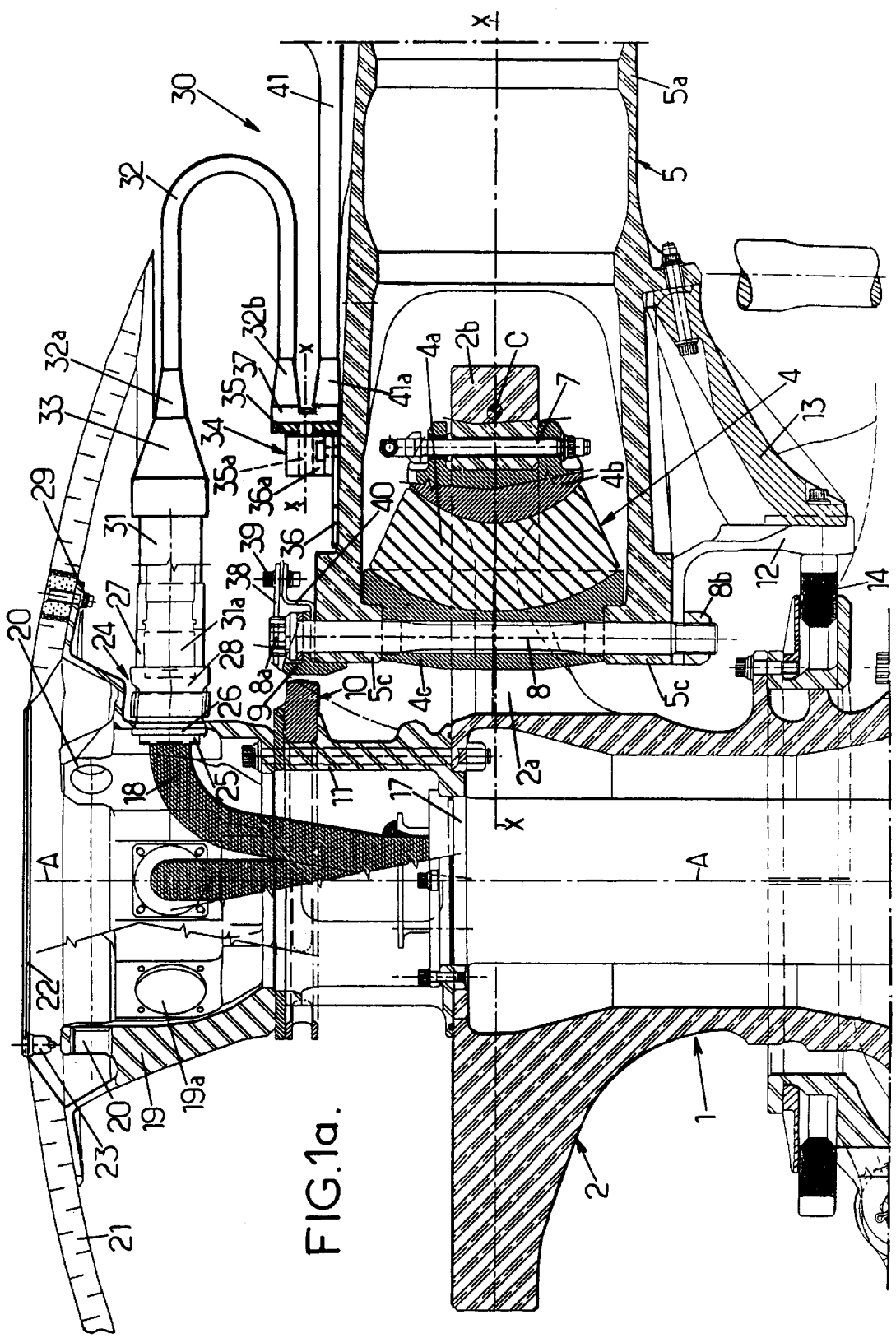

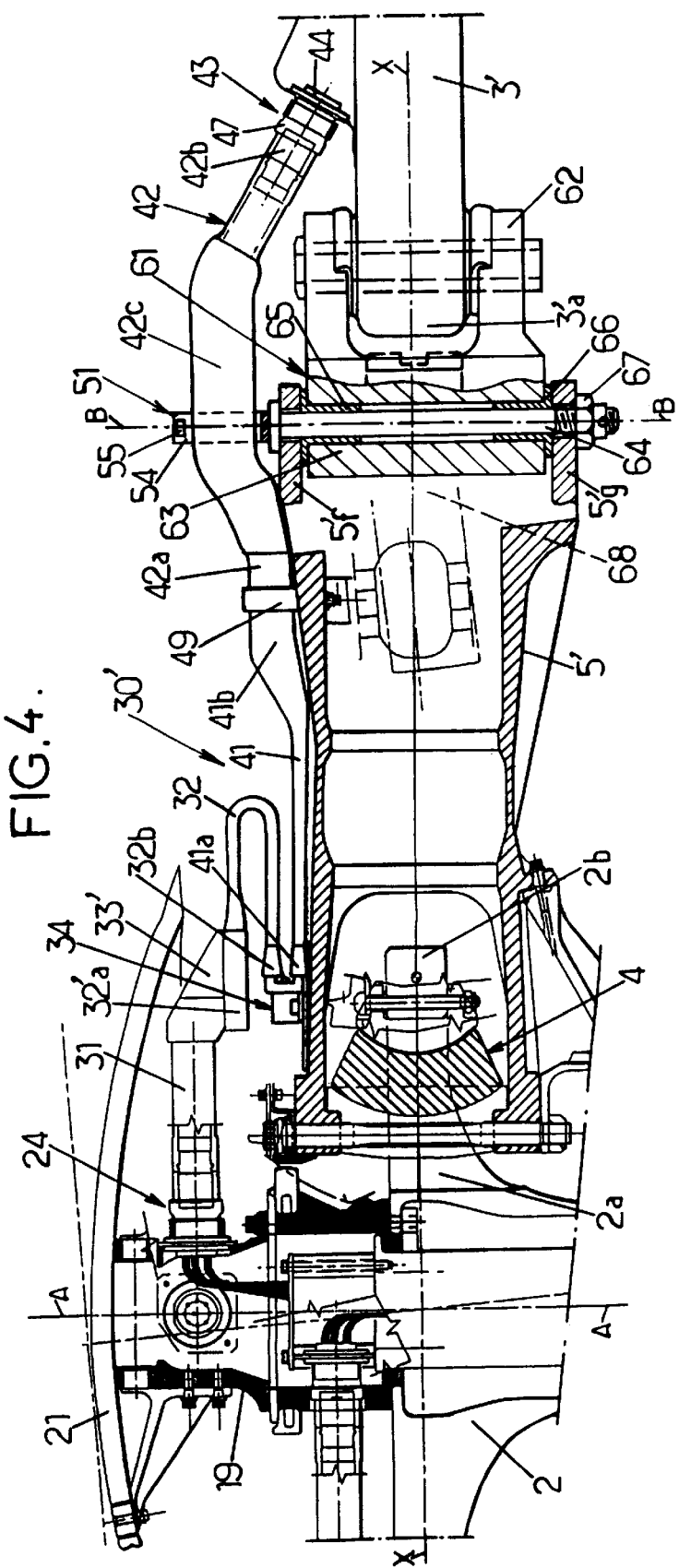
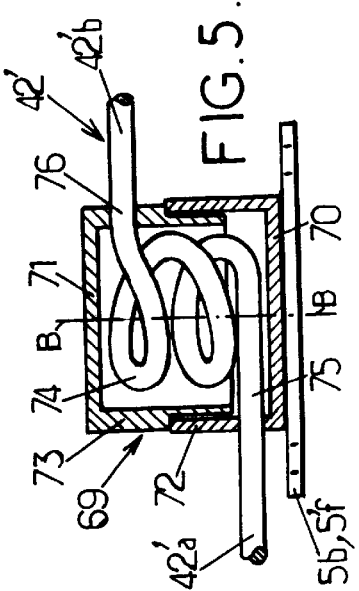
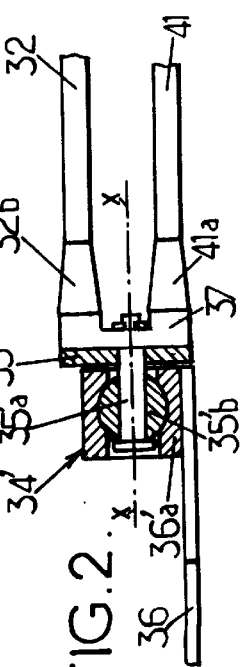

DE-ICING CONNECTION SYSTEMS FOR ROTOR AIRCRAFT ROTOR

The invention relates to improvements made to systems in accordance with EP 0 754 623 for the electrical connection between at least one electrical power supply conductor and an electrical de-icing device of a rotor blade of a rotor aircraft, of the type including:

a hub, rotating integrally with a rotor mast around an axis of rotation of the rotor, and at least two blades, each of which is connected to the hub by means of a connection part substantially radial relative to the axis of rotation and itself connected to the hub by retaining and articulation means.

As in EP 0 745 623, by electrical de-icing device must be understood any de-icing or anti-icing device requiring, for its operation, actuation or control, an electrical power supply.

The connection system of the invention is of the type known via EP 0 754 623 and including at least one cable connecting to at least one electrical conductor and connecting said power supply conductor carried by the hub to at least one electrical conductor of said de-icing device carried by the blade, the connection cable including a first section, one first end of which, in the internal radial position, is connected to said power supply conductor of the hub by a first connector mounted on the hub, and the second end of which is connected to a first end of a second section of said connection cable, said second section including a first aerial brace, in the shape of a flattened half-loop, and its second end being connected to said de-icing conductor of said blade by a second connector, installed on the blade, at least said first brace having a non shielded structure and having an elongated part of flattened substantially rectangular transverse section, the largest dimension of which is substantially perpendicular to the axis of rotation, and a concavity turned substantially towards said articulation and retaining means, said first brace being able to bend and to twist to accommodate angular pitch, lag and flapping movements of the blade and of its connection part relative to the hub.

Although the non-shielded structure, the flattened substantially rectangular transverse section and the arrangement of the first brace allow it to bend and twist to accommodate the aforementioned angular movements, the first brace nonetheless withstands not insignificant stresses, by virtue, in particular, of the rigid connection of the second end of the second cable section on the connection part, particularly by means of a plate supporting head lock-washers of connecting bolted pins of an internal radial armature of the retaining and articulation means in an internal radial clevis of the connection part, in a particular embodiment described in EP 0 754 623. The drawback of such a rigid connection is that it transmits to the first aerial brace stresses linked in particular to the angular pitch movements of the connection part and of the blade, to the frequency of blade pitch control, and therefore to the twisting distortions of the second cable section with this frequency.

The object of the invention is to propose a connection system of the type known via EP 0 754 623, and for which the mechanical and electrical resistance of the connection cable is further improved, in particular with regard to its first aerial brace, by fittings ensuring an attenuation of mechanical stresses at least of the second connection cable section, when the rotor rotates.

Another object of the invention is to propose such a system reducing also the stresses and/or movements of the connection cable in its section connecting the connection part to the blade root when these two components are separate, and, in a general way, being better suited to the different practical demands than known embodiments, particularly via EP 0 754 623.

To this end, the connection system according to the invention is characterised in that said second end of said second section is connected to said connection part by a first connection which is articulated at least by pivoting around an axis substantially parallel to the longitudinal pitch change axis of said connection part and said blade.

This pivoting articulated connection avoids or at least reduces the distortions of the connection cable from the pitch movements of the connection part and of the blade, from the controlling frequency of the blades, which gives the connection cable a longer life.

According to an advantageously straightforward embodiment, this first articulated connection includes a pivot pin, secured to one of the two components constituted by a fixing plate on said connection part and a support of said second end of said second cable section, said pivot pin extending in a substantially radial plane passing through the axis of rotation and the pitch axis and being pivoting mounted, preferably with the interposition of a selflubricating bearing, in a sleeve secured to the other of said two components constituted by said fixing plate and said support.

However, in an embodiment which is advantageous in that it also allows the second cable section at least partial relief from the stresses occasioned by lagging and flapping motions of the connection part and of the blade, the first articulated connection includes a ball joint connection between a support of said second end of said second cable section and a fixing plate on said connection part, and this ball joint is to advantage centered in a substantially radial plane passing through the rotation and pitch axes, and is retained around a pivot pin substantially parallel to said pitch axis of said connection part and of said blade, so as to allow this articulated connection to be acted upon relatively symmetrically forwards and backwards, during the different angular movements of the connection part and the blade.

Additionally, when the second end of the second cable section is connected to the second connector by being connected, as is known via EP 0 754 623, to a first end of a third connection cable section, this third section extending substantially radially on the connection part by being fixed to the latter by at least said first connection and a second connection, respectively near its first and second ends, in respectively internal and external radial positions, and when said third section is connected by its second end to said second connector, it is advantageous for the support of said first articulated connection to be a cable connector support between said second end of said second cable section and said first end of said third cable section. These two contiguous ends of consecutive sections of the connection cable are thus actuated by the same pivoting, ball joint, movement relative to the connection part and to the blade, when these latter perform their angular movements on a rotating rotor, which causes less stress on the corresponding cable connector.

For a rotor on which each connection part is distinct from the corresponding blade root and comprises an external radial part arranged, directly or indirectly, in an external clevis in which said blade root is retained, and pivoting mounted around a folding pin of said blade relative to said connection part, and on which additionally the connection between said second cable section and said second connector is provided, as known via EP 0 754 523, by means of a fourth cable section, including a second aerial brace extending from said connection part to the blade, and an end part of which is connected to said second connector, it is additionally advantageous for a part of said second aerial brace to be retained in at least one retaining part mounted in the substantially axial extension of said folding pin.

This technical measure provides the following advantages: on a manual blade folding rotor, on which the external radial part of each connection part is directly arranged as an external clevis, in which the corresponding blade root is retained by two pins substantially parallel to each other, and one of which is removable to allow manual blade folding relative to the connection part by pivoting around the other pin, it is no longer necessary to disconnect the connection between the fourth cable section and the de-icing device at the level of the second connector, before blade folding and when the fourth cable section is relatively short in length. For a rotor on which the external radial part of each connection part is indirectly arranged as an external clevis, by means of a folding hinge fitting constituting the external radial part of the connection part and mounted on the latter by a connection pivoting around the folding pin of the blade and of the hinge fitting relative to the connection part, while the blade root is retained in the external clevis of this folding hinge fitting, for an automatic folding of the blade, it is no longer necessary to provide a rotating connector with a fixed part on the connection part, and a rotating part rotary mounted coaxially to the pivoting connection of the folding hinge fitting on the connection part to provide the connection between the second connector, on the blade, and the rotating connector, on the connection part, by means of the second connection cable brace. In both cases (manual folding or automatic folding) the retaining part avoids movements of the second brace on either side of the folding pin, during folding or unfolding of the blade, which avoids detrimental twisting of the fourth connection cable section, provided the second brace is long enough, which also makes any disconnection at the level of the second connector unnecessary, before the folding of a blade.

For the second connection cable brace to adopt by itself the position in which it is acted upon mechanically as little as possible, during folding or unfolding of the blade, the retaining part is to advantage mounted freely rotating coaxially by a foot on the folding pin. However, for questions of environment and space requirement near and around the blade roots and connection parts, particularly by virtue of the presence of driving actuators, the retaining part may be fixed on the folding pin so as to occupy to advantage a fixed position relative to the corresponding connection part, in order to reduce the movements of the second connection cable brace, during folding or unfolding of a blade, and to thus prevent any locking of this second brace with another rotor part, the operation of which may be adversely affected as a result.

In an advantageously straightforward embodiment, the retaining part, which is mounted symmetrically for the left and right blades of a rotor, in the extension of one or other of the two blade pins, depending on the blade side considered, on a manual folding rotor, is fitted as a fork in which is engaged, and preferably retained by at least one resilient tab, an elongated part of non-shielded structure and flattened substantially rectangular transverse section of said second aerial brace.

Such a retaining part fitted as a fork may include a cylindrical support with an axial vent opening in an end face of the opposite side to said folding pin, said axial vent being passed through by said elongated and flattened part of the second aerial brace.

In this case, it is advantageous for this elongated part of flattened substantially rectangular transverse section of the second aerial brace to be connected to said second connector by said end part, of cylindrical section, of said fourth cable section, the opposite end part of which, at the other end of said elongated and flattened part of the second brace, is connected, on said connection part, to the second end of said third cable section, which also has, as known via EP 0 754 623, a non-shielded structure and also has an elongated part of flattened substantially rectangular transverse section, but the largest dimension of which is orientated substantially perpendicularly to the largest dimension of the flattened substantially rectangular transverse section of the elongated part of the second brace which is retained by said retaining part.

As a variant, to reduce the length of the fourth connection cable section, and more particularly to be fitted to an automatic blade folding rotor, the retaining part is configured substantially as a cylindrical box coaxial to the folding pin and closed by a bottom and a lid, said cylindrical box enclosing a length of at least one coil of said fourth cable section, of circular section, between a first end part of said length, passing through a half-box secured to the bottom and fixed to this half-box, and a second end part of said length, passing through the other half-box, integral with the lid, and fixed to this other half-box, which is mounted to rotate freely coaxially to the folding pin on the bottom half-box, fixed to said connection part, said second end part of said length of the fourth cable section extending by said second aerial brace towards said second connector, whereas said first end part of said length of the fourth cable section is connected to said first aerial brace, by means of said third cable section.

In this embodiment variant, on folding or unfolding of a blade, the second brace is driven by the blade and rotates the lid half-box on the bottom half-box without incurring significant stresses on the at least one coil, and preferably two coils of said length of circular section of the fourth cable section, which is thus slightly tightened or slackened in the cylindrical box of the retaining part.

Other advantages and characteristics of the invention will emerge from the description given below, as a non-restrictive example, of two embodiment examples described by reference to the appended drawings in which:

FIGS. 1a and 1b show partially a first example of a de-icing connection system for a helicopter main rotor with blades connected to the hub by connection parts in sleeves with a double clevis on which the blades can be folded manually, FIG. 2 is a diagrammatic view partly in cross section and partly in side elevation of an articulated connection variant of FIG. 1a, FIG. 3 is a diagrammatic perspective view of a retaining part of an elongated and flattened part of the second brace of the system in FIG. 1b, FIG. 4 is a view similar to FIGS. 1a and 1b showing the connection system according to the invention on a rotor each blade of which is connected to the hub by a connection part in a sleeve with a folding hinge fitting in which the blade root is retained and with which the blade is folded automatically, and FIG. 5 is a diagrammatic view, partly in cross section and partly in side elevation, of a retaining part variant.

FIG. 1a and 1b show a helicopter main rotor and a connection system which are respectively identical and very similar to the rotor and to the system in FIGS. 1a and 1b in EP patent 0 754 623, to which reference will be made for more details, and the description of which is incorporated by way of reference for the identical components, with the result that the same numerical references are used to denote corresponding identical or similar components.

It may be recalled that the mast 1 of the rotor is of a single piece with the hub 2, and rotates with it around the axis of rotation A—A of the rotor, the hub 2 being a radial plate having, for each blade 3 of the rotor, a recess 2a passing through an external radial part of the hub 2, to partially house retaining and articulation means 4 for retaining and articulating on the hub 2a connection part 5 for connecting the corresponding blade 3 to the hub 2.

The connection part 5, henceforth called sleeve in the description since its central part 5a is tubular, is placed substantially radially relative to the axis A—A, and its external and internal end parts are respectively fitted in an external clevis 5b, with two parallel branches between which is retained the root 3a of the blade 3, and in an internal clevis 5c, the two parallel branches of which provide the connection to the retaining and articulation means 4.

In a known way, the blade root 3a is retained in the external clevis 5b by two pins 6 parallel to each other, symmetrical on either side of the longitudinal pitch change axis X—X of the sleeve 5 and of the blade 3, and substantially perpendicular to this pitch axis X—X, one of the pins 6 being removable, with the result that the blade 3 can be folded manually, towards the front or towards the back of the helicopter, after the rotor has stopped, by pivoting relative to the sleeve 5 around the other pin 6.

As is also known, the retaining and articulation means 4 are constituted by a spherical laminated bearing with a central part 4a, constituted by an alternating stack of resiliently distortable layers and rigid cups in sphere portions, between an external radial armature 4b, overlapping the external edge 2b of the recess 2a and fixed to this edge 2b of the hub 2 by bolted pins 7, and an internal radial armature 4c, fixed, in the recess 2a, as a spacer between the branches of the clevis 5c by bolted pins 8, the tightening heads 8a with flange of which hold an upper collar 9 on the upper branch of the internal clevis 5c, opposite a top flapping stop mechanism 10, mounted to be retractable in flight on a tubular support 11 bolted on the central part of the hub 2. Nuts 8b screwed on the lower ends of the pins 8 fix a lower collar 12 under the lower branch of the internal clevis 5c, this collar 12 being held, by means of a spacer 13 bolted under the sleeve 5, radially opposite a droop restraining ring 14, mounted with radial clearance around the mast 1, and forming a low flapping stop common to all blades 3.

Each blade 3 is fitted with a de-icing or anti-icing device (not shown) including a bundle of electrical conductor wires incorporated in the blade 3, near its leading edge, and the internal radial end of this conductor bundle emerges on the upper face of the blade 3, near its blade root 3a, in the form of a de-icing cable shown in the diagram as 15 and gathering together several elongated electrical conductors, one of which is shown in the diagram as 16. The de-icing cable 15, of possibly shielded structure, with an external sheath surrounding the conductors 16 insulated from each other, is supplied with electrical power from an electrical manifold 17 mounted in the tubular central part of the hub 2 and bolted in the base of the support 11. For each blade 3, the outlet of the manifold 17 is connected to an electrical power supply cable 18, of conventional shape and structure, for example of circular section and shielded, and this cable 18 is connected to the shielded base plate 25, with square fixing flange 26, of a connector 24. Each base plate 25 with flange 26 is placed in a housing 19a provided in an annular support 19, on which the flange 26 is fixed by screws. The support 19, with slinging rings 20, supports a streamlined blister 21, joined on by bolts 29, and the central opening of which is closed by a fixed lid 22 removable by a rapid fixing mechanism 23, so as to allow the manifold 17 to be mounted, the support 19 being directly mounted on the support 11.

The electrical connection of the conductors of the power supply cable 18 to the conductors such as 16 of the de-icing cable 15 of the blade 3 is provided by a connection cable 30, of evolutive section shape and structure, which includes essentially four sections in series.

The first section 31 is rectilinear, of conventional structure or shielded, of circular section, and placed above the internal clevis 5c of the sleeve 5 and orientated substantially radially like the sleeve 5, and the internal radial end 31a of the section 31 is mounted in a shielded connector 27 of a shielded plug 28 connected in the base plate 25 of the connector 24. The external radial end of the section 31 is connected, directly in its radial extension and by a connector 33 of tapered section, to a first end 32a of the second section 32, constituted by an elongated part, of flattened rectangular transverse section, and which is folded onto itself in a flattened half-loop forming an aerial brace with concavity turned towards the axis of rotation A—A, the brace 32 extending radially like the sleeve 5, to which it is connected by its second end 32b, straight under the first end 32a, as described below.

The rectangular section of the brace 32, of non-shielded structure, is just like the one in FIG. 2a in EP 0 754 623, the ends 32a and 32b being simply thicker than the elongated and braced central part. It may be recalled that this cable section 32 may include elongated electrical conductors (copper wires) substantially parallel and spaced from each other and embedded in an insulating and resiliently distortable sheathing matrix (elastomer or natural rubber), this matrix being confined between two strips of material constituting the main faces of the section 32. Given the arrangement of the braced section 32, the main sides of its rectangular transverse section are substantially perpendicular to the axis of rotation A—A of the rotor. The material, preferably with a preponderance of longitudinal carbon or aramid fibres, gives the structure good tensile resistance, which is necessary given that the section 32 is pulled by the centrifugal force, on rotation of the rotor, in order to reduce random stresses which may be exerted on this section 32 by a relative feathering effect, while the resiliently distortable matrix, between the conductors and the strips of material on which this matrix is vulcanised, allows a relative longitudinal sliding between the conductors and the material, which allows a certain dissociation between the mechanical stresses and the electrical stresses. Although low in mass, this cable section 32 placed in this way as a flattened brace is equipped with both good tensile resistance and good bending and twisting flexibility, to accommodate as far as possible centrifugal movements and angular pitch, flapping and lag movements of the sleeve 5 and of the blade 3 around the centre of articulation C of the spherical laminated bearing 4, this centre C being located in the corresponding rim 2b of the hub 2.

The connection of the end 32b of the brace 32 to the sleeve 5 is no longer a rigid connection, as described in EP 0 754 623, by means of a metal sheet secured to this end and acting as a support to the lock-washers 38 of the tightening heads 8a of the bolted pins 8, which lock-washers 38 are fixed by bolts 39 on a counter angled metal sheet 40 tightened between the upper collar 9 and the upper face of the internal clevis 5c by the pins 8 which pass through it.

According to the invention, this connection 34 is a connection articulated by pivoting around a geometric axis x—x which is parallel to the axis of pitch X—X of the sleeve 5 and of the blade 3 and extends in the substantially radial plane passing through the axis A—A of rotation and the axis of pitch X—X. This pivoting connection 34 includes a support 35 integral with one end of a pivot pin 35a coaxial to the axis x—x and rotary mounted, preferably with interposition of a self-lubricating bearing for example of PTFE, within a coaxial sleeve 36a fixed by screwing on a fixing plate 36, fixed also by screwing, on the upper face of the upper branch of the clevis 5c of the sleeve 5, the support 35 supporting, on the side opposite the pivot pin 35a, a cable connector 37, which connects mechanically and electrically the end 32b of the braced section 32 to the internal radial end 41a of a third cable section 41.

In this way the ends 32b and 41a of the sections 32 and 41 are secured, by the connector 37, to a same support 35, which is not acted upon by the rotations of the sleeve 36a and of the plate 36 with the sleeve 5 around its pitch axis X—X. The result is that it is thus possible to avoid distortions of these parts of the connection cable by the pitch movements from the controlling frequency of the blades 3.

The section 41 is rectilinear and extends radially on the upper face of the sleeve 5 to its external radial end, fitted as a tapered section connector 41b, located radially outside the brace 32, the cable section 41 having the same non-shielded structure and the same flattened rectangular section shape as the brace 32. The central part of the section 41 is therefore an elongated part, whose largest dimension of its rectangular transverse section is substantially perpendicular to the axis of rotation A—A, when the sleeve 5 is non-operative.

By the tapered section connector 41b, the rectilinear cable section 41 is connected mechanically and electrically to a first end 42a of the fourth cable section 42, constituting a second aerial brace which connects the sleeve 5 to the blade 3, being connected by its second end 42b to the de-icing cable 15 of the blade 3 by a second connector 43.

This connector 43 is shielded and includes a base plate 44 connected to the de-icing cable 15 and equipped with a flange 45, by which the shielded base plate 44 is fixed on a support 46 projecting over the upper part of the blade root 3a, outside the area of the latter which is received in the external clevis 5b of the sleeve 5. The connector 43 also includes a plug 47, shielded, connected in the base plate 44, and this plug 47 comprises a shielded connector 48 in which is mounted the end part 42b, of a certain length, of the brace 42, and the section of which is circular and the structure of which is shielded similar to that of the first cable section 31.

Thus, the first and second aerial braces 32 and 42 of the connection cable 30 connect the sleeve 5 respectively to the hub 2 (by means of the first cable section 31) and to the blade 3, and the connection cable 30 is connected to the sleeve 5 near the internal end 41a of the section 41 by the first articulated connection 34 described above, and at the level of the external end 41b of the section 41 by a second connection now to be described.

This second connection includes a metal collar 49 surrounding a substantially cylindrical portion of the end 41b of tapered shape of the section 41, and this collar 49 is integral with a fitting 50 fixed by screws against the upper face of the sleeve 5.

Between its end 42a, thus retained on the sleeve 5 by the collar 49 and the fitting 50, and its end part 42b connected to the connector 43, the fourth aerial braced cable section 42 comprises an elongated part 42c, of non-shielded structure, of flattened substantially rectangular transverse section, the largest dimension of which extends substantially perpendicularly to the largest dimension of the transverse section of same flattened rectangular shape of the central part of the third cable section 41.

As shown in FIG. 1b and in FIG. 3, this elongated part 42c is retained in a retaining part 51, fitted as a fork and mounted in the axial extension of the one of the two pins 6 which is used as a folding pin, after withdrawal of the other pin 6, for folding or unfolding the blade 3 by pivoting relative to the sleeve 5 around the pivot pin 6. The retaining part 51 is a cylindrical support 52 extended coaxially downwards by a foot 53 in the form of a cylindrical journal of smaller diameter, and the body 52 has an axial vent 54 opening in the upper face of the body 52, which body also supports a resilient tab 55 projecting towards the inside of the vent 54, to retain in the latter a portion of the elongated and flattened part 42c which has been engaged by the top in this vent 54, so that the elongated and flattened part 42c of the second aerial brace 42 passes through the vent 54 of the retaining part 51. The latter is mounted freely rotating by its foot 53 in the upper end of the pivot pin 6, as shown diagrammatically in FIG. 1b, with the result that on folding or unfolding of the blade 3, the part 42c of the aerial brace 42 rotates the retaining part 51 coaxially around the folding axis B—B in the position in which this part 42c is the least acted upon mechanically, while being thus prevented from moving on one side and on the other of the folding axis, the lengths of the elongated and flattened part 42c and of the end part 42b being sufficient for it to be pointless to disconnect the plug 47 from the base plate 45 of the connector 43, before the folding of the blade 3.

As a variant, to avoid any interference between the elongated and flattened part 42c of the second aerial brace 42 with parts such as actuators for example, which are present around or near to the blade roots and/or external ends of neighbouring sleeves, during folding or unfolding operations of the blade considered, or else for other environmental reasons, the retaining part 51 is fixed by its foot 53 in the upper end of the folding pin 6 with the result that this part 51 is no longer rotating around the folding axis B—B, but fixed in position relative to the sleeve 5, so as to retain the aerial brace 42 in a set position, of non-interference, during folding and unfolding operations of the blade 3.

Whether the retaining part 51 is rotary or not, this part 51 is still mounted on the one of the two pins 6 which constitutes the folding pin, and which is not the same pin for a right blade or a left blade of the rotor, relative to the longitudinal and median plane of the helicopter. For blades on the same side (right or left) of this plane, the folding pin 6 of each blade is the one which is the nearest to the leading edge of this blade, whereas for blades on the other side (right or left) the folding pin is the pin 6 nearest to the trailing edge.

As shown in FIGS. 1a and 1b, the cable section 41 can be left free between the two connections to the sleeve 5 which are near its ends, i.e. the articulated connection 34 and the fixed connection of the collar 49 and of the fitting 50, in particular if the upper face of the sleeve 5 has a protective coating in contact with this cable section 41.

But, to avoid friction between the section 41 and the sleeve 5, and to avoid possible whipping of this section 41, an additional connection may be made, as shown schematically in FIGS. 1a and 1b, and, as a preferred example, in FIGS. 4 and 5 of EP 0 754 623, by means of threaded pins fixing on the sleeve 5 a plate acting as a base to an additional bearing with a central fantail groove making a sliding bearing allowing the cable section 41 to be held with a freedom of movement in the axis of the sleeve 5, but without possibility of transverse whipping or friction.

In this way can be made a de-icing connection system with a connection cable 30, the routing of which between the two end connectors 24 and 43 is relatively direct and allows an arrangement even less acted upon than embodiments according to EP 0 754 623, the structure and the section shape of the cable sections being well adapted to the locations and to local mechanical stresses, the area subject to the largest stresses being that of the first aerial brace 32, which, given its arrangement nearest the centre of articulation C of the whole of flapping mass constituted by the sleeve 5 and the corresponding blade 3, given its orientation and its non-shielded structure, which makes it relatively flexible in twisting and bending, and given its connection to the sleeve 5 by the pivoting articulated connection 34, fully accommodates the relative movements of the flapping mass (3–5) and of the hub 2 during rotation of the rotor and lag and flapping motions, and especially in pitch motions of the flapping mass.

To improve also the accommodation of the brace 32 to the angular movements of the flapping mass (5–3) in lag and in flapping, the pivoting articulated connection 34 in FIG. 1a can be replaced, as shown diagrammatically in FIG. 2, by an articulated connection with a ball joint 34'. Once again the ends 32b and 41a of the second and third cable sections 32 and 41 respectively are connected to each other by the cable connector 37 supported by the support 35 made integral with a pivot pin 35'a, and once again a sleeve 36'a is integral with a fixing plate 36, for example by screwing, on the sleeve 5. But, in FIG. 2, a ball joint 35'b is retained around the pivot pin 35'a and inside the sleeve 36'a, so as to allow not only the overall pivoting of the ends 41a and 32b with the support 35 around the geometrical axis x—x of the pivot pin 35'a, relative to the sleeve 36'a and to the plate 36 fixed to the sleeve 5, during pitch movements of the latter, but also general pivotings of the ends 32b and 41a with the ball joint 35'b, centred in a substantially radial plane passing through the axes A—A and X—X, when the sleeve 36'a and the plate 36 are affected, with the sleeve 5, by angular flapping and lag movements around the centre of articulation C. An angular freedom of a few degrees in lag and in flapping, offered by the ball joint 35'b, is enough to reduce quite considerably the bending and twisting stresses to which the sections 32 and 41 of the connection cable 30 may be subjected by virtue of the movements of drag and flutter of the blades. The result is a significant extension of the life of the connection cable 30.

Likewise, the retaining part 51 in FIG. 3 facilitates the maintenance of the aerial brace 42 of the cable 30, preventing it from twisting, particularly during folding and unfolding operations of the blade 3.

FIG. 3 also shows diagrammatically the non-shielded structure of the elongated and flattened part 42c, which comprises elongated conductors 42d embedded in a resilient protection matrix 42e vulcanised between two fibre material strips 42f forming the main sides of the flattened rectangular section of this cable part.

It may be noted that the cable section 30 is rectangular and flexible in the areas acted upon constituted by the first and second aerial braces 32 and 42, and, to a lesser extent, the third section 41, whereas the section is circular in the first section 31 and in the end part 42b of the fourth section, which are parts which are possibly shielded and connected to connectors 24 and 43. The connection cable 30 is thus constituted of sections adapted to mechanical stresses and to location.

The second rotor example in FIG. 4 is not essentially different from the one previously described except that each blade 3' can be automatically folded relative to its sleeve 5' connecting it to the hub 2 by means of an actuator 68 placed in the sleeve 5' and pivoting on the latter a folding hinge fitting 61 to which the blade 3' is fixed by its root 3'a, with the result that the similar components are identified by the same assigned numerical references with a prime symbol.

Each blade 3' has its root 3'a fixed by two pins in a clevis 62 of the folding hinge fitting 61, which is pivoting mounted on the external radial part of the sleeve 5' around the geometrical folding axis B—B, moved laterally relative to the axis X—X of the sleeve 5', by means of a cylindrical and lateral bearing 63 on one side of the hinge fitting 61 and which rotates around a pin 64 of the folding articulation. This bearing 63 is retained in an external and lateral radial clevis with upper 5'f and lower 5'g branches of the sleeve 5' by the pin 64, around which the bearing 63 rotates by means of shouldered bushes 65 and 66 engaged around the pin 64 and in the bearing 63, and each supported against a respectively upper and lower face of the bearing 63, a nut 67 being screwed and retained on the threaded lower end of the pin 64 which projects under the clevis lower branch 5'g. By operating the actuator shown as 68 in FIG. 4 and fixed by its body in the sleeve 5', the hinge fitting 61 is pivoted around the pin 64, coaxial to the pivoting axis B—B. On the side of the axis X—X opposite the bearing 63, the hinge fitting 61 comprises a stop (not shown), turned towards the sleeve 5' and being housed in a housing (also not shown) open radially outwards from the sleeve 5', in the position of the hinge fitting 61 not folded by the actuator 68, and which corresponds to the flight configuration. Operation of the actuator 68 allows, in a known way, the hinge fitting 61 and the blade 3' to be pivoted by a folding angle around the axis B—B.

On this rotor example, and contrary to similar embodiments in FIGS. 6, 7 and 13 in EP 0 754 623, it is not necessary to mount a connection cable comprising a rotating connector, with a fixed part and a rotating part which are coaxial around the folding axis by means of a pin extension fixed on the folding pin 64, and such that the fixed part is fixed on the sleeve 5' and connected electrically and mechanically to the third cable section by an additional cable section, whereas the rotating part is connected to the end of the second aerial brace which is connected to the sleeve 5', so as not to have to disconnect the plug from the base plate of the connector on the blade 3', before folding the blade 3' with the hinge fitting 61 relative to the sleeve 5'.

On the contrary, the rotor with automatic folding of the blades in FIG. 4 can also be fitted with a connection cable 30' which is very similar, if not identical, to the cable 30 in FIGS. 1a and 1b.

In particular, the connection cable 30' in FIG. 4 also comprises a pivoting articulated connection 34, or, as a variant, the ball joint articulated connection 34' in FIG. 2, in order to connect the contiguous ends 32b and 41a of the braced cable section 32 and of the rectilinear cable section 41 to the sleeve 5', on the one hand, and, on the other hand, the retaining part 51 in FIG. 3, mounted coaxially on the folding pin 64, and rotating freely on the latter around the axis B—B or fixed in rotation, for environment constraints, and such that a portion of the elongated part 42c of flattened rectangular section of the second aerial brace 42 is engaged and retained in the axial vent 54 of the part 51 by the tab 55.

As in the previous example, the brace 42 is connected to the connector 43 on the blade 3' by an end part 42b of circular section, and the opposite end 42a of this brace 42 is connected to the external end 41b of the rectilinear section 41 substantially at the level of the fixing collar 49 on the sleeve 5'.

As shown in FIG. 4, the connection cable 30' of the second example differs from the one in the first example only by the embodiment of the connector 33' of evolutive section between the first section 31 connected to the connector 24, and the first end 32'a of the braced section 32, which first end 32'a is no longer in the direct radial extension of the first section 31, but under the connector 33'.

FIG. 5 shows diagrammatically an embodiment variant of the fourth cable section 42', in this case of preferably circular transverse section. In this variant, the retaining part 51 with axial vent 54 in FIG. 3 is replaced by a cylindrical box 69 of circular section closed at its ends by a bottom 70 and by a lid 71 respectively integral with a lower half-box 72 and an upper half-box 73. The latter may freely rotate coaxially on the lower half-box 72, fixed by its bottom 70 on the upper branch of the clevis 5b in FIG. 1b or on the upper branch 5'f of the sleeve 5' in FIG. 4, so that the upper half-box 73 is rotary around the folding axis B—B. This box 69 encloses a length 74 of the fourth cable section 42' which represents slightly more than two coils rolled one over the other in the box 69, and so that a first end part 75 of this length 74 passes laterally through the lower half-box 72 being fixed or retained at this level to this half-box 72, and extends outside the box 69 by the end part 42'a of the fourth section 42', by which this section 42' is connected to the end 41b of the third section, by a connection, for example by the collar 49 and the fitting 50 in FIG. 1b, to the sleeve 5 or 5'. The other end part 76 of the length 74 of cable retained in the box 69 passes laterally through the upper half-box 73 and its retained or fixed at this point on this half-box 73, and extends outwards from the box 69 by a part 42'b which constitutes the second aerial brace and is connected to the connector 43 in FIG. 1b or FIG. 4.

In this variant, more particularly intended for a rotor with automatic blade folding, according to FIG. 4, when the blade 3 or 3' pivots on folding or unfolding, it drives with it the aerial brace 42'b, which rotates the upper half-box 73 on the lower half-box 72, so as to incur a tightening or a slackening of the two coils of length 74 of cable in the box 69, without however introducing too high a level of stresses in this length 74 and without loading the cable part connected to the lower half-box 72 towards the end part 42'a. In this variant, the fourth cable section 42' is of non-shielded structure, in order to have the requisite flexibility, except possibly in its end part immediately adjacent and connected to the connector 43.

Also as a variant, the pivot 34 and ball joint 34' articulated connections described above can be used to connect the second end of the second aerial braced cable section to the sleeve, in an embodiment according to FIGS. 6 and 8 of EP 0 754 623, in which this aerial brace is orientated in an substantially circumferential direction and has its first end connected to a part of the first cable section, which extends on the hub, in the circumferential direction, and is itself connected to another, radial, part of this first cable section which also extends on the hub, between two recesses and two neighbouring sleeves.

As another variant, the fixing plate 36 of the pivot 34 and ball joint 34' articulated connections can be fixed by bolts 39 on the metal sheet 40 and the lock-washers 38 of the heads of bolted pins 8, in which case the first cable section 31 can be very short and the first aerial brace 32 brought as close as is possible to the axis of rotation A—A.

Moreover, to improve retention of the cable part 42c in the axial vent 54 of the retaining part 51 in FIG. 3, radial screws may pass through the cylindrical support 52 so as to emerge in the axial vent 54, perpendicularly to the medium plane of this vent, to ensure wedging therein the cable part 42c which passes through it.

What is claimed is:

1. An electrical connection system between at least one electrical power supply conductor and an electrical de-icing device of a blade of a rotor aircraft rotor, of the type including:

a hub, rotating integrally with a rotor mast around an axis of rotation of the rotor, and at least two blades, each of which is connected to the hub by means of a connection part substantially radial relative to the axis of rotation, said connection part being connected to the hub by retaining and articulation means, the connection system including at least one connection cable connecting at least one electrical conductor and connecting said power supply conductor carried by the hub to at least one electrical conductor of said de-icing device carried by the blade, said connection cable including a first section, one first end of which, in the internal radial position, is connected to said power supply conductor of the hub by a first connector mounted on the hub, and the second end of which is connected to a first end of a second section of said cable, said second section including a first aerial brace, in the shape of a flattened half-loop, and its second end being connected to said de-icing conductor of said blade, by a second connector, installed on the blade, at least said first brace having a non-shielded structure and having an elongated part of flattened substantially rectangular transverse section, the largest dimension of which is substantially perpendicular to the axis of rotation, and a concavity turned substantially towards said retaining and articulation means, said first brace being able to bend and to twist out of shape to accommodate angular pitch, lagging and flapping movements of the blade and of its connection part relative to the hub, wherein said second end of said second section is connected to said connection part by a first connection which is articulated at least pivoting around an axis substantially parallel to a longitudinal pitch change axis of said connection part and said blade.

2. A system according to claim 1, wherein said first articulated connection includes a ball joint connection between a support of said second end of said second cable section and a fixing plate on said connection part.

3. A system according to claim 2, wherein said ball joint, centred in a substantially radial plane passing through said axes of rotation and pitch, is retained around a pivot pin substantially parallel to said axis of pitch of said connection part and of said blade.

4. A system according to claim 1, wherein said first articulated connection includes a pivot pin, integral with one of the two components constituted by a fixing plate on said connection part and a support of said second end of said second cable section, said pivot pin extending in a substantially radial plane passing through said axis of rotation and said axis of pitch and being pivoting mounted, in a sleeve integral with the other of said two components constituted by said fixing plate and said support.

5. A system according to claim 4 wherein said second end of said second cable section is connected to said second connector by being connected to a first end of a third section of the connection cable, said third section extending substantially radially on said connection part by being fixed to the latter by at least said first connection and a second connection, respectively near its first and second ends, in respectively internal and external radial positions, said third section being connected by its second end to a second connector, and wherein said support of said first articulated connection is a cable connector support between said second end of said second cable section and said first end of said third cable section.

6. A system according to claim 5, for a rotor on which each connection part is distinct from a corresponding blade root and comprises an external radial part arranged as an external clevis in which said blade root is retained, and pivoting mounted around a folding pin of said blade relative to said connection part, the connection between said third cable section and said second connector being provided by means of a fourth cable section, including a second aerial brace extending from said connection part to the blade, and a second end part of which is connected to a second connector, wherein a part of said second aerial brace is retained in at least one retaining part mounted in a substantially axial extension of said folding pin.

7. A system according to claim 6, wherein said retaining part is mounted freely rotating coaxially by one foot on the folding pin.

8. A system according to claim 6, wherein said retaining part is fixed on said folding pin so as to occupy a fixed position relative to said connection part.

9. A system according to claim 6, wherein said retaining part is fitted as a fork in which is engaged, and preferably retained by at least one resilient tab, an elongated part of non-shielded structure and flattened substantially rectangular transverse section of said second aerial brace.

10. A system according to claim 9, wherein said retaining part includes a cylindrical support with an axial vent opening in an end face on the opposite side to said folding pin, said axial vent being passed through by said elongated and flattened part of the second aerial brace.

11. A system according to claim 9, wherein said elongated part of flattened substantially rectangular transverse section of the second aerial brace is connected to said second connector by said second end part, of cylindrical section, of said fourth cable section, a first end part of which is connected, on said connection part, to the second end of said third cable section, which also has an elongated part of non-shielded structure and of flattened substantially rectangular transverse section, the largest dimension of which is orientated substantially perpendicularly to the largest dimension of the flattened substantially rectangular transverse section of the elongated part of the second brace which is retained by said retaining part.

12. A system according to claim 6, wherein said retaining part is configured substantially as a cylindrical box coaxial to the folding pin and closed by a bottom and a lid, said cylindrical box enclosing a length of at least one coil of said fourth cable section of circular section, between a first end part, passing through a half-box, integral with the bottom and fixed to this half-box, and a said second end part, passing through the other half-box, integral with the lid, and fixed to this other half-box, which is mounted to rotate freely coaxially to the folding pin on the bottom half-box, fixed to said connection part, said second end part of said length of the fourth cable section extending by said second aerial brace towards said second connector, whereas said first end part of said length of the fourth cable section is connected to said third cable section.

* * * * *